Oct. 29, 1963    L. R. BEACH ETAL    3,109,060
LIGHT INFORMATION RECORDING SYSTEM
Filed Sept. 27, 1960    2 Sheets-Sheet 1

INVENTORS.
LAURENCE R. BEACH
WILLIAM C. SLAGLE
BY RICHARD E. THOMAN

ATTORNEY 3,109,060
LIGHT INFORMATION RECORDING SYSTEM
Laurence R. Beach, San Diego, William C. Slagle, La Jolla, and Richard E. Thoman, San Diego, Calif., assignors to General Dynamics Corporation, Rochester, N.Y., a corporation of Delaware
Filed Sept. 27, 1960, Ser. No. 58,791
9 Claims. (Cl. 178—6.8)

This invention relates to display apparatus, and more particularly to apparatus that indicates both present and past conditions.

It is well known that radar is used to present displays that show the positions of targets—such as airplanes, ships, etc.—as they are situated at that particular moment. In the display, the position of each target is shown by a spot of light known as a "blip"; the individual blips moving in accordance with their associated targets. In this way, each blip's instantaneous position corresponds to its respective target's instantaneous position.

It would frequently be desirable to predict each target's prospective route—in order to avoid a collision, or to plan defensive or aggressive maneuvers. These predictions would, of necessity, be based on each target's "history," i.e., the path that each target or blip has followed.

However, historic information of this type is not readily available from the usual radar display, because radar systems are primarily designed to display current information. In order for the radar system to provide a precise, clear, non-confusing display, the radar apparatus permits each blip to disappear before a new one appears. The radar display therefore shows only the current, instantaneous positions of the targets.

Prior art attempts to display both current status and history have used—among other devices—long-persistence phosphors, storage-type cathode ray tubes, and memory or storage devices. None of these approaches was satisfactory. For example, long-persistence phosphors permitted the blip to remain visible for a somewhat longer interval, but not long enough to supply enough historic information to be useful; storage tubes tend to have relatively poor resolution; and storage and memory devices require complex circuitry.

It is therefore the principal object of our invention to provide apparatus that will display, not only the instantaneous location of various targets, but also their past positions.

The attainment of this object and others will be realized from the following specification taken in conjunction with the drawings, of which:

Broadly speaking, our invention contemplates a sequential display system wherein each display includes one or more preceding displays incorporated therein to provide history. The historic displays are made progressively fainter, so that the history fades off into invisibility. In this way the history forms a trail that indicates the path of the target; the amount of displayed history being under the control of the operator.

Figure 1:
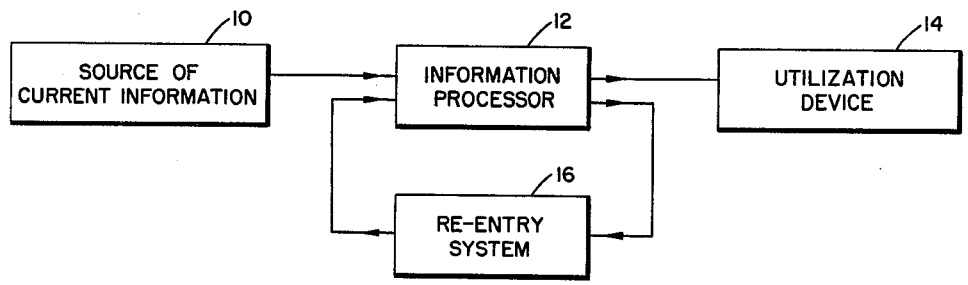
FIGURE 1 shows the basic concept of our invention.

FIGURE 1 shows our basic inventive concept in block diagram form. Here continuously current information is obtained from a source 10—which may be a radar system—is presented to an information processor 12—which may use photographic techniques, a thermoplastic recorder, a xerographic plate, or any other suitable apparatus and/or process. The processed information is then applied to a utilization device 14, such as a viewing screen.

In operation, the first display consists of current information. In accordance with our invention, the processed information is fed through a re-entry system 16—from where it emerges as "history" and is composited into the then current information that forms the second display. This second display therefore contains the then current information and one unit of history.

For the third display, the composite second display forms the history, and is consolidated with the then current information. This resultant third display therefore contains the then current information and two units of history.

This process is continued so that each display contains both current and historic information. The historic information is attenuated, or made fainter, under the control of the operator, who may therefore control the amount of historic information displayed.

In this way any given dipslay comprises bright current information and historic information whose brightness decreases in accordance with its age. Thus, the progressively decreasing brightness of the historic information produces a fading trail that shows the past positions of the target; the lengths of the various trails indicating the relative speeds of the targets.

Figure 2:
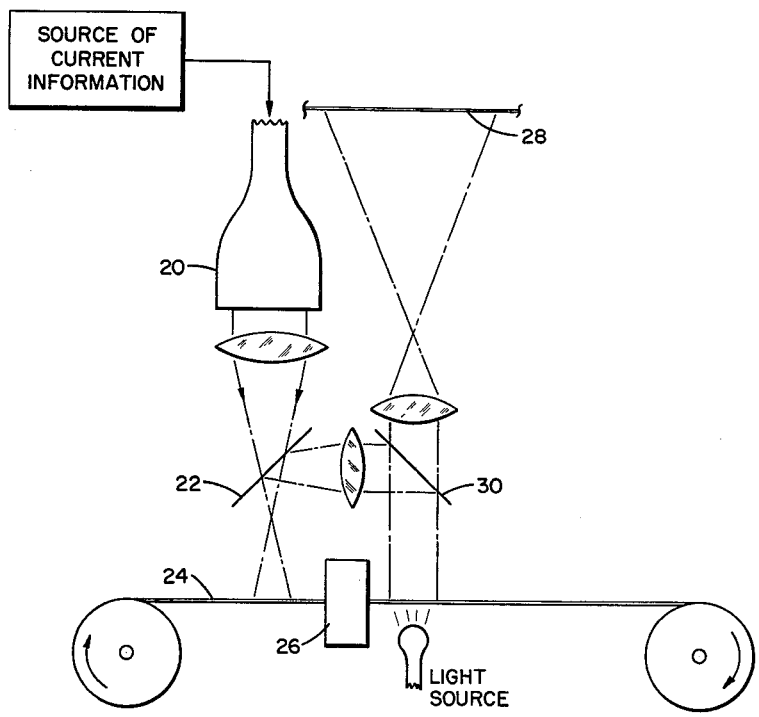
FIGURES 2 and 3 show embodiments thereof.

FIGURE 2 shows an embodiment of our invention that uses photographic techniques. In this embodiment current radar-type information, appearing on the face of cathode ray tube 20, is projected through a "partial" mirror 22 to a recording medium; namely a strip of photographic film 24. When the light impinges on the film, it exposes a corresponding pattern of blips. Movement of the film causes the exposed frame to enter a film processor 26 that develops the film in the well known manner. When the developed frame of film emerges from the processor, it enters a projection system that presents it on viewing screen 28.

As is well known, partial mirrors transmit some of the impinging light and reflect the rest. As a result, part of the light directed toward the viewing screen is reflected by the second partial mirror 30 in such a manner that it strikes first partial mirror 22, and is directed onto a subsequent frame of the film. Simultaneously current information from the cathode ray tube is imaged onto the same second frame. The exposed second frame is therefore a composite of the current information from the cathode ray tube and the historic information from the first frame of the film.

Due to the attenuation of light by the partial mirrors, the lens systems and adjustable shutters therein—which are omitted for clarity—the historic information is somewhat fainter than the current information.

The second frame traverses the film processor 26 and is then projected onto viewing screen 28. Here it produces a display comprising one bright blip that corresponds with the present position of the target and a second fainter blip that indicates where the target had been previously.

For the third frame the current information is again imaged onto the photographic film and the historic information, which now comprises a bright blip and a fainter adjacent blip, is projected by means of the partial mirrors onto the third frame. When this third frame is processed and projected onto the viewing screen, it shows three blips; the brightest one being the current information, while the two progressively fainter ones show the historic information—that is, the position of the target during the second and first frames.

This procedure is repeated so that each display shows a bright blip for the current position of the target and a series of progressively fainter blips that show past target positions. The attenuation of the historic information is controlled so that the preceding blips become fainter at a predetermined rate. By varying the attenuation, the operator determines whether the historic information comprises one frame, two frames, or a large number of them.

When it is desired not to show any prior history at all, the equipment provides complete attenuation; that is, that none of the historic information can find its way back to the film.

In this way our apparatus provides a composite display that includes current information and an amount of historic information that is under the control of the operator.

While the embodiment of the invention shown in FIGURE 2 was explained in terms of photographic film, it may alternatively use thermoplastic film, or any other material that will accept the light images.

Figure 3:
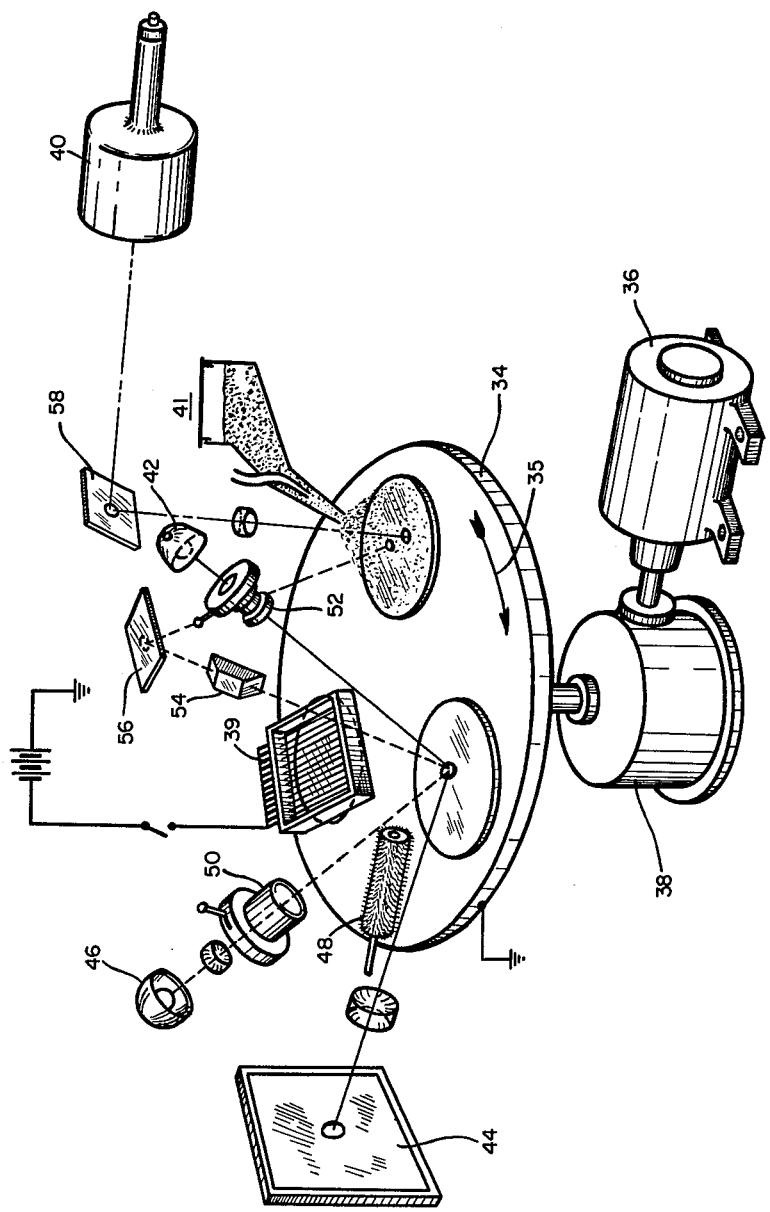

FIGURE 3 shows an embodiment of our invention that uses an electrographic process. As is well known, in one form of electrographic printing a sheet of photoconductive material is passed through a "charging" station where a uniform electrical charge is produced on the surface thereof. The material is then positioned at an "exposing" station where it is subjected to a light pattern; the impinging light causing selected areas of the photoconductor to become conductive. Electrical charges leak off through the conductive areas; the remaining charges producing a charge pattern that corresponds to the impinging light. Particles are caused to adhere to the charge pattern; and the photoconductor bearing the particle pattern then moves to a "projection" station. Since the photoconductive material has a shiny surface, light directed thereat is reflected by the photoconductor; but is not reflected by the adhering particles. Therefore the reflected light beam has a cross section corresponding to the incident light, and may be directed to a viewing screen to form a display; this step being known as "specular projection."

The embodiment of our invention shown in FIGURE 3 comprises a platform 34 which is rotated in the direction of arrow 35 by means of motor 36 and Geneva gear or other suitable arrangement 38—so that the platform assumes three different positions.

Platform 34 carries a recording medium that takes the form of three electrographic elements.

To start the cycle an electrographic element is positioned at the charging station where a uniform electrical charge is produced on the surface by charging structure 38. Platform 34 is then rotated so that the charged element stops at the "exposure" station. Here, current information from cathode ray tube 40 exposes the element positioned at the expose station. As previously explained, the impinging light produces a charge pattern on the surface, and particles from an apparatus 41 are deposited to adhere to the charge pattern. Platform 34 is then rotated so that the exposed element stops at a projection station.

At the projection station two effects take place. The first is that specular projection, using light source 42, produces a display on viewing screen 44; the display comprising the data impressed by the cathode ray tube at the time of exposure.

The second effect is to composite the information at the projection station as history with the then current information at the exposure station. To achieve this second effect, a second specular projection system, using light source 46, causes the data at the projection station to be directed back to the exposure station where it becomes history, and is consolidated with the then current information from the cathode ray tube. The electrographic element at the expose station therefore receives current information from the cathode ray tube and receives historical information from the preceding electrographic element.

Further rotation of platform 34 causes a brush 48 to clean the surface of the electrographic element; whereupon it is ready to be recharged and pass through the cycle again. It will be obvious that each rotational step causes the various electrographic elements to be similarly processed.

In this way each electrographic element receives new information and historical information, a composite of which is then projected onto the viewing screen.

Since it is desired that the historical information be somewhat fainter than the current information, the various specular projecting systems contain means for reducing the amount of light. These may include irises 50 and 52, or any other well known device.

As platform 34 rotates, the angular position of the pattern on the various electrographic elements is changed. An optical element 54 known as a "Dove" prism may be used to assure that the historical information and the current information are properly oriented. Similarly mirrors 56 and 58 may be used for proper positioning.

If desired, the electrographic element of FIGURE 3, instead of being mounted on a rotating platform, may be mounted on an endless-belt-type conveyor.

The particular embodiment of the invention illustrated and described herein is illustrative only and the invention includes such other modifications and equivalents as may readily appear to those skilled in the art, within the scope of the appended claims.

We claim:
1. The combination comprising: a source of varying information; means for temporarily storing said information emanating from said source; a utilization device; means for attenuating and feeding back information at the output of said storing means into the input of said storing means where it is combined as historic information with the then-current information emanating from said source; and means for applying the information at the output of said storing means to said utilization device—whereby the result is a composite of current and historical information.

2. A display device comprising: a plurality of recording elements; means for advancing said plurality in an element-by-element manner; means for projecting current information onto a given element—whereby said element is exposed; means for developing said exposed element; means for causing said developed element to produce a display; optical means including controllable attenuating means for directing an attenuated replica of said display onto a subsequent element—whereby said subsequent element is exposed by current information and by historical information from said preceding element; and means comprising said developing means, for developing said exposed subsequent element to produce a second display.

3. The combination of claim 2 wherein said recording medium is a photographic film.

4. The combination of claim 2 wherein said recording medium is a thermoplastic film.

5. The combination of claim 2 wherein said recording medium is an electrographic recording medium.

6. A display device comprising: recording means having at least two discrete regions; means for advancing said recording means in a stepwise manner; means for projecting current information onto a given region of said recording means—whereby said given region is exposed; means for developing said exposed given region; means for causing said exposed and developed given region to produce a first image; optical means including controllable attenuating means and a partial mirror for directing an attenuated replica of said first image onto a subsequent region; means for projecting the then-current information onto said subsequent region to produce a second image—whereby said subsequent region is exposed by said first and second images; means, comprising said developing means, for developing said exposed subsequent region to produce a composite image; and means for displaying said composite image.

7. A display device comprising: a reel of photographic film; means for advancing said film in a frame-by-frame manner; means, comprising a cathode ray tube and an optical system, for projecting current information onto a given frame—whereby said frame is exposed; means for developing said exposed frame; means for projecting light through said exposed and developed frame for producing a display; means, comprising an optical system, attenuating means, and partial mirrors, for directing a replica of said display onto a subsequent frame; means, comprising said cathode ray tube and said optical system, for projecting then-current information onto said subsequent frame—whereby said subsequent frame is exposed by current information from said cathode ray tube and by historical information from said preceding frame; means, comprising said developing means, for developing said exposed subsequent frame to produce a second display; and means, comprising said light projecting means, for producing a composite display from the information on said subsequent frame.

8. A display device comprising: a rotating platform comprising a plurality of xerographic elements; means for rotating said platform in an element-by-element manner; means for projecting current information onto a given frame—whereby said frame is exposed; means for developing said exposed frame; means for causing said exposed and developed frame to produce a first display; means for directing a replica of said first display onto a subsequent frame; means for projecting the then-current information onto said subsequent frame to produce a second display—whereby said subsequent frame is exposed by said first and second displays; means, comprising said developing means, for developing said exposed subsequent frame to produce a composite display; and means for displaying said composite display.

9. A display device comprising: a rotatable platform comprising a plurality of xerographic elements; means for rotating said platform in an element-by-element manner; means for uniformly charging said elements; means comprising a cathode ray tube and an optical system, for projecting current information in the form of a light image onto a given element; means for selectively discharging said uniform charge on said given element in correspondence with said light image—whereby said element is exposed to produce a charge pattern corresponding to said light image; means for xerographically developing said exposed element; means for reflecting light from said exposed and developed element to produce a display; means, comprising an optical system, attenuating means, and partial mirrors, for directing a replica of said display onto a subsequent uniformly charged element; means, comprising said cathode ray tube and said optical system, for projecting then-current information in the form of a second light image onto said subsequent element—whereby said subsequent frame is exposed by current information from said cathode ray tube and by historical information from said preceding element; means for selectively discharging said uniform charge on said subsequent element in correspondence with said first and second light images; means, comprising said developing means, for developing said exposed subsequent element to produce a second display; and means, comprising said light projecting means, for producing a composite display from the information on said subsequent element.

References Cited in the file of this patent
UNITED STATES PATENTS

| | | |
|---|---|---|
| 2,521,635 | Kornei | Sept. 5, 1950 |
| 2,586,772 | Ashby | Feb. 26, 1952 |
| 2,777,745 | McNaney | Jan. 15, 1957 |